Patented Nov. 11, 1941

2,262,735

UNITED STATES PATENT OFFICE 2,262,735

SYNTHESIS OF THIAMIN AND PRODUCT

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application September 15, 1939, Serial No. 295,046

13 Claims. (Cl. 195—28)

The invention relates to a procedure for the formation of vitamin $B_1$, hereinafter called thiamin, and to a product resulting therefrom.

More particularly, it pertains to a process for the synthesis of thiamin through the influence of a yeast, and includes correlated improvements and discoveries whereby formation of thiamin is facilitated and characteristics of the yeast enhanced.

It is an object of the invention to provide a process in accordance with which thiamin may be synthesized from suitable intermediates.

Another object of the invention is to provide a procedure for the synthetic production of thiamin, which may be readily, economically and effectively carried out commercially.

A further object of the invention is the provision of a process whereby thiamin is synthesized in the presence of and through the action of a yeast, and from suitable intermediates incorporated into a yeast nutrient medium.

An additional object of the invention is to provide a process in which thiamin is produced from a pyrimidine and a thiazole in the presence of yeast, with a storing of the produced thiamin within the yeast cells.

A particular object of the invention is the provision of a yeast having good color, baking and keeping qualities, and characterized by a distinctive content of thiamin, and by marked fermentative properties.

Other objects of the invention will in part be obvious and will in part appear hereinafter.

The invention accordingly comprises the several steps and the relation of one or more of such steps with respect to each of the others, and the product possessing the features, and properties which are exemplified in the following detailed disclosure, and the scope of the invention will be indicated in the claims.

The formation of thiamin in the practice of the invention may be brought about by incorporating suitable intermediates therefor into a medium containing a yeast and nutrient materials for its sustenance. The yeast effects a combination of the intermediates with the production of thiamin, and we have found a high protein yeast, e. g., Fleischmann type 189, to be particularly efficacious as a means for accomplishing synthesis of thiamin. As intermediates there may be utilized those which, upon combination, yield thiamin, more particularly, a pyrimidine and a thiazole, especially an amine pyrimidine, and specifically 2-methyl-5-ethoxy methyl-6-amino pyrimidine, having the probable formula.

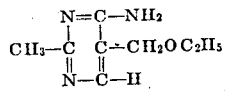

and 4-methyl-5-beta hydroxy ethyl thiazole having the probable formula

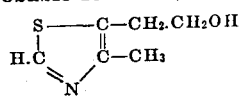

When the pyrimidine, either alone or in conjunction with a thiazole, is incorporated into a medium containing yeast and yeast nutrient materials, there is effected a combination between the pyrimidine and the thiazole, with the formation of thiamin. The thiamin formed becomes a component part of the yeast, and is retained thereby, hence yielding a yeast having an augmented thiamin content.

As a medium suitable for the synthesis of thiamin in the presence and under the influence of yeast, there may be employed an aqueous solution containing a yeast assimilable ammonium salt, as ammonium phosphate, sulfate and the like, a yeast innocuous calcium compound, as mono-calcium phosphate and a yeast assimilable carbohydrate material, such as a cereal wort or a sugar-containing solution, as beet and cane molasses. A suitable nutrient medium is prepared and a pyrimidine, alone or in conjunction with a thiazole, incorporated thereinto. This medium is then seeded with yeast and the yeast permitted to act therein under proper temperature and pH conditions with aeration. Preferably, the yeast is added to a part of the nutrient medium, and the remainder of such medium added throughout the interval of the yeast action by the additory or zulauf procedure.

While the pH value may rise to 6.0, it is preferable to adjust it throughout the period of activity to a value of from 4.1 to 5.2. The temperature desirably is about 30° C., and the aeration, while energetic during the major portion of the period of reaction, is reduced during the final stages. Action of the yeast may continue for various periods, as from five to ten hours, and we have found that conversion of the pyrimidine alone, or in conjunction with a thiazole, into thiamin is substantially complete. The thiamin formed is retained within the yeast cells, and consequently leads to the production of yeast having a materially increased content of thiamin. Hence, in addition to the synthesis of thiamin, the procedure yields as a product a yeast having a high thiamin content, which may be separated therefrom by a suitable method, including plasmolysis or autolysis, separation of yeast protein, and finally obtainment of thiamin through evaporation and purification. A yeast employed in such synthesis of thiamin may have a resulting thiamin content of from 100 to 400 International units. More particularly, the thiamin content may be from 150 to 250 International units, and a commercially satisfactory amount has been found to be about 200 International units. The vitamin G content may be about 15 to 25 Sherman units per gram, dry basis.

As an illustrative embodiment of a manner in which thiamin may be synthesized through the influence of a yeast, the following examples are presented:

Example I

A nutrient medium is prepared by utilization of about 100 liters of water in which there may be dissolved about 20 lbs. of a mixture of suitably clarified beet and cane molasses, together with sufficient amounts of ammonium sulfate, ammonium dihydrogen phosphate and monocalcium phosphate to nourish the yeast, and about .003% each of 2-methyl-5-ethoxy methyl-6-amino pyrimidine and 4-methyl-5-beta hydroxy ethyl thiazole.

About 20% of the foregoing nutrient medium may be placed in a receptacle and seeded with about 30 lbs. of yeast, for example, Fleischmann type 189. The acidity of the solution may be adjusted from time to time during the period of reaction, as by means of ammonium hydroxide, to a pH value which may be from about 4.1 to 5.2. The temperature is adjusted and maintained at about 30° C. The remainder of the nutrient medium may be added by a zulauf procedure in order to maintain the activity of the yeast and the Balling at a substantially constant value, and aeration of the seeded medium conducted. Activity of the yeast was permitted to continue for five hours under the foregoing conditions, and then the yeast was separated in the usual manner from the medium or wort. An increase in amount of yeast resulted, and the thiamin content, as determined by the gas test (Journal American Chemical Society, vol. 59, page 948—1937) was 197 International units per gram, dry basis, which corresponded to a 99.1% conversion of the pyrimidine and thiazole. A yeast produced heretofore by the usual methods possesses a thiamin content of from 4 to 6 International units per gram in a baker's type of yeast, and from 15 to 20 units in a brewer's yeast. While the thiamin content is distinctly augmented, there is not a corresponding increase in vitamin G content. In fact, we have found that there is little, if any, augmentation with respect to vitamin G.

Example II

A nutrient solution may be prepared by taking about 140 liters of water and dissolving therein about 75 lbs. of the above mentioned admixture of yeast nutrients, and .005% 2-methyl-5-ethoxy methyl-6 amino pyrimidine and 4-methyl-5-beta hydroxy ethyl thiazole. About 8% of the nutrient solution may be introduced into a receptacle of suitable size and seeded with a yeast, for example, Fleischmann 189 type, in an amount of about 24 lbs. Addition of the remaining nutrient solution is effected by means of a zulauf procedure, adjusting the acidity from time to time if necessary in the manner above indicated. Aeration is initiated at the time of seeding, and is continued throughout the period of reaction. The temperature at which the reaction is carried out is about 30° C., and while the acidity may be reduced to a pH value of about 6.0, it is desirable to maintain it at from about 4.4 to 5.2. At the conclusion of the period of activity the yeast may be separated in a suitable manner, as by centrifuging. An assay of the yeast by the gas test method indicated the thiamin content to be about 233 International units per gram on a dry basis, and this indicates a conversion of the pyrimidine and thiazole amounting substantially to 100%.

Example III

A nutrient solution may be prepared, as in Example I, and the procedure carried out in like manner with seeding with a Gebruder-Mayer yeast. Addition of nutrient medium is effected by zulauf with initial seeding in 12% of the nutrient medium, and subsequent additions according to the yeast activity. Further, the introduction of the nutrient medium and aeration may be conducted at half-hour intervals. A yeast was thus obtained having a thiamin content of about 100 International units per gram, dry basis, with a conversion of pyrimidine and thiazole of about 100%.

Example IV

A nutrient solution or wort containing molasses and yeast nutrient salts may be prepared and seeded with about 20% of Fleischmann type 189 yeast. The medium may be aerated and a carbohydrate and nutrient salt added in solution in accordance with a zulauf procedure. The reaction or conversion may be effected at a temperature of about 30° C. Yeast resulting from the foregoing procedure and in a medium containing no pyrimidine showed a vitamin $B_1$ content by the gas analysis procedure of 6 International units. When the medium contained a small amount of 2-methyl-5-ethoxy methyl-6 amino pyrimidine the yeast obtained had a vitamin $B_1$ content of 13 International units per gram. The inclusion of the pyrimidine accordingly leads to the synthetic formation of thiamin in significant amount.

The foregoing procedures effect a synthetic formation of thiamin through the combination or coupling of suitable intermediates, as the pyrimidine and thiazole specifically mentioned. When these are incorporated into a nutrient medium and subjected to the influence of a yeast, which may be of a high protein type, or of a low protein type, or of an intermediate type, such as a beer yeast, the conversion into thiamin is substantially quantitative and, the thiamin being retained in the cells of the organism, yields a yeast having a distinctively high thiamin content. Further, the yeast may be a yeast used for brewing, baking, production of fodder, or production of wine, and more especially of the Saccharomyces group, such as S. cerevisiae. A yeast so obtained is characterized not only by a high thiamin content, but also in that it has markedly greater fermentative action so that the leavening power of a baker's yeast is not decreased. The yeast, further, possesses good color, keeping qualities and baking strength, and when incorporated in a dough batch it leads to the production of a baked product having an increased thiamin content. Moreover, it will be realized that the reaction may also be effected by allowing yeast to act in a medium containing all the nutrient substances, the pyrimidine and the thiazole, with properly attending aeration, pH and temperature conditions.

Thus, in the manufacture of white bread, the use of the high thiamin yeast makes it possible to restore to the flour the thiamin content of the original grain, and provide a pound loaf of bread which will contain about 450 International units of thiamin.

While a certain pyrimidine and thiazole are specifically mentioned in the foregoing examples, it will be realized that other pyrimidines and thiazoles capable of reacting under the influence of yeast to form thiamin may be incorporated into the medium, such as 2-methyl-4-amino-5-thioformyl amino-methyl pyrimidine having the probable formula

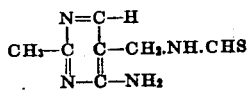

pyrimidines containing, in the 5. position, the group CH₂X, this being a methyl group containing a substituent reactive group X which may be an ethoxy group, and the like, all being 5 substituted methyl pyrimidines characterized by having the group

at the 5 position. As a thiazole there may be employed the 4-methyl thiazoles containing, in position 5., a grouping of the character —CH₂.CH₂OH. Moreover, the thiazole may be formed in situ by reaction between suitable compounds as thioformamide and chloroacetopropyl alcohol, or acetropropyl alcohol.

In addition to the synthesis of thiamin being carried out in a yeast nutrient medium, as set forth above, the reaction might be effected also in other nutrient media, for example, doughs, and worts which may be synthetic or more especially those utilized for the production of spirits.

Since certain changes in carrying out the above process, and certain modifications in the product may embody the invention without departing from its scope, it is intended that all matter contained in the above description shall be interpreted as illustrative and not in a limiting sense.

Having described our invention, what we claim as new and desire to secure by Letters Patent is:

1. A method for formation of thiamin, which comprises subjecting a 5 substituted methyl pyrimidine capable of being combined by yeast to form thiamin to the influence of yeast in a nutrient medium containing yeast assimilable nutriment.

2. A method for formation of thiamin, which comprises subjecting a methyl amino pyrimidine to the influence of yeast in a nutrient medium containing a yeast assimilable carbohydrate, and a yeast assimilable inorganic salt.

3. A method for formation of thiamin, which comprises subjecting 2-methyl-5-ethoxy methyl-6-amino pyrimidine to the influence of yeast in a nutrient medium containing a yeast assimilable carbohydrate, and a yeast assimilable inorganic salt.

4. A method for the formation of thiamin, which comprises subjecting 2-methyl-4-amino-5-thioformyl amino methyl pyrimidine to the influence of yeast in a nutrient medium containing a yeast assimilable carbohydrate, and a yeast assimilable inorganic salt.

5. A method for the formation of thiamin, which comprises subjecting a 5 substituted methyl pyrimidine and a methyl thiazole both capable of being combined by yeast to form thiamin to the influence of yeast in a nutrient medium containing yeast assimilable nutriment.

6. A method for the formation of thiamin, which comprises subjecting 2-methyl-5-ethoxy methyl-6-amino pyrimidine and 4-methyl-5-beta hydroxy ethyl thiazole to the influence of yeast in a nutrient medium containing a yeast assimilable carbohydrate, and a yeast assimilable inorganic salt.

7. As a composition of matter, a medium for formation of thiamin containing yeast, yeast nutrient materials, and a 5 substituted methyl pyrimidine capable of being combined by yeast to form thiamin.

8. As a composition of matter, a medium for formation of thiamin containing yeast, yeast nutrient materials and a methyl amino pyrimidine.

9. As a composition of matter, a medium for formation of thiamin containing yeast, yeast nutrient materials, a 5 substituted methyl pyrimidine and a methyl thiazole both capable of being combined by yeast to form thiamin.

10. As a composition of matter, a medium for formation of thiamin containing yeast, yeast nutrient materials, and 2-methyl-5-ethoxy methyl-6 amino pyrimidine.

11. As a composition of matter, a medium for formation of thiamin containing yeast, yeast nutrient materials, and 2-methyl-4-amino-5-thioformyl amino methyl pyrimidine.

12. As a composition of matter, a medium for formation of thiamin containing yeast, yeast nutrient materials, 2-methyl-5-ethoxy methyl-6 amino pyrimidine and 4-methyl-5-beta hydroxy ethyl thiazole.

13. A method for the formation of thiamin which comprises subjecting a 2-methyl-amino pyrimidine and a 4-methyl thiazole to the influence of yeast in a nutrient medium containing yeast assimilable nutriment.

ALFRED S. SCHULTZ.
LAWRENCE ATKIN.
CHARLES N. FREY.